United States Patent Office 3,634,523
Patented Jan. 11, 1972

3,634,523
DIHALOHYDRINS
Richard B. Lund, Whippany, John Vitrone, Parsippany, and John F. Sereno, Pine Brook, N.J., assignors to Allied Chemical Corporation, New York, N.Y.
No Drawing. Original application Dec. 20, 1965, Ser. No. 515,208. Divided and this application Aug. 18, 1969, Ser. No. 864,248
Int. Cl. C07c 31/16
U.S. Cl. 260—618 D                3 Claims

ABSTRACT OF THE DISCLOSURE

Dihalohydrins of the formula

wherein R and R' are lower alkyl groups, Y is halogen and M is

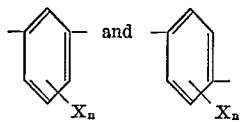

wherein X is hydrogen, halogen, nitro and alkyl groups and $n$ is 1 or 2. These compounds are prepared by reaction of the corresponding dialkylene compounds with a hypohalous acid. The compounds are useful to form the corresponding diepoxides which can be cured to infusible resins.

---

This is a division of application Ser. No. 515,208 filed Dec. 20, 1965 and now abandoned.

This invention relates to novel epoxides and to a process for their preparation. More particularly, this invention relates to novel aromatic diepoxides, novel intermediates therefor, and novel polymeric products therefrom, and to processes for their preparation.

The reaction of polyhydric alcohols with epichlorohydrin in the presence of an alkali to prepare glycidyl ethers which can be further reacted with curing agents to the corresponding thermoset polymers is well known. These polymers have enjoyed outstanding commercial success and wide use as encapsulating materials, coatings, high strength adhesives, laminates, and the like, due to their excellent physical and chemical properties. Curing occurs through the epoxide ring which is highly activated by the presence of the ether linkage such that it opens in the presence of curing agents to form three-dimensional, cross-linked, infusible polymers.

We have discovered novel diepoxides having unique structures, i.e., the epoxy rings are substituted directly on an aromatic ring, which can be reacted with conventional epoxy curing agents to prepare hard, clear, infusible, polymers.

It is an object of the invention to provide novel diepoxides wherein the epoxy groups are substituted directly on an aromatic ring.

It is another object to provide a process for the preparation of these novel diepoxides.

It is a further object to provide thermoset polymers derived from the diepoxides of the invention.

The novel diepoxides of the invention consist of compounds of the formula:

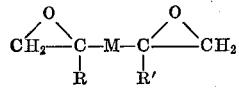

wherein R and R' are members independently selected from the group consisting of alkyl radicals having from 1 to 5 carbon atoms, and M is a member selected from the group consisting of divalent radicals of the formula:

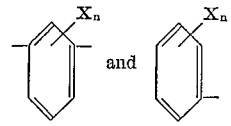

wherein X is a member independently selected from the group consisting of hydrogen, halogen and nitro radicals, and alkyl radicals having from 1 to 5 carbon atoms, and $n$ is an integer from 1 to 2.

These diepoxides can be prepared readily by reacting a dialkylene compound of the formula:

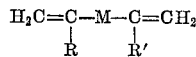

wherein R, R' and M are as hereinabove defined, with a hypohalous acid preferably at a temperature of 20° to 100° C. to form the corresponding dihalohydrin having the formula:

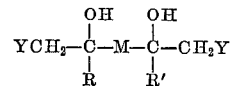

wherein Y is a halogen radical, and R, R' and M are as defined hereinabove, and reacting said dihalohydrin with an alkali metal hydroxide to prepare the above-described diepoxides.

The diepoxides of the invention can be further reacted with chemical hardening agents to provide infusible, thermoset polymeric resins having wide utility as adhesives, coatings, encapsulating agents, and the like.

In a preferred process for the preparation of the novel diepoxides of the invention, the above-described dialkylene compound is added to an aqueous solution of hypohalous acid containing at least two mols of hypohalous acid per mol of dialkylene compound. Preferably a slight excess of hypohalous acid is added to insure complete reaction. The hypohalous acid can be added directly or it can be formed in situ by the reaction of a halogen donor with water. As an illustration, hypobromous acid is produced by the reaction in water of N-bromo acetamide, N-bromosuccinimide, N-bromocaprolactam, and the like. The reaction which produces the corresponding dihalohydrin will take place at room temperature or higher simply by admixing the reactants for a time sufficient to effect complete reaction.

The dihalohydrins described above undergo dehydrohalogenation in the presence of a strong base to form the corresponding diepoxides. Excess water is removed by any convenient manner such as evaporation, decantation and the like, and a concentrated solution of at least 20% by weight, and preferably from about 50% to about 70% by weight, of an alkali metal hydroxide in water is added. Suitable hydroxides include lithium hydroxide, sodium hydroxide and potassium hydroxide. At least two mols of alkali metal hydroxide is required to epoxidize one mol of dihalohydrin. Preferably 50 mols of hydroxide per mol of dihalohydrin is employed to increase the rate of reaction. The temperature of this reaction can vary widely, but it is generally desirable to maintain a temperature from about 25° C. up to about 85° C. The optimum conditions and length of reaction time will vary depending upon the reactivity of the reactants and their concentration. The diepoxide product can be recovered and purified in any convenient manner as will be known to one skilled in the art.

The diepoxides of the invention vary from liquids to solid materials which can be further reacted with conventional curing agents to form hard, transparent, solid polymeric products. A great variety of curing agents can be employed in effecting this polymerization that include, among others, lithium hydride; tetraethyl ammonium hydroxide; carboxylic acids and anhydrides such as oxalic, maleic and pyromellitic acids, phthalic and trimellitic anhydrides, pyromellitic dianhydride; and amines such as dimethylamino methyl phenol, tridimethyl amine methyl phenol, α-methylbenzyl dimethylamine, benzyl dimethylamine, and boron trifluoride monoethylamine.

The amount of curing agent employed is dependent upon the particular type of agent selected; with catalytic curing agents the usual range is from about 5 to 15 parts per hundred parts of resin by weight. Depending upon the reactivity of the curing agent, curing may be accomplished at room temperature with heat produced by exothermic reaction or may require application of external heat. In general, increasing the temperature hastens curing to a solid thermoset resin.

The following examples are given to further illustrate the invention, but it is to be understood that the invention is not to be limited to the details described therein.

EXAMPLE 1

To a slurry of 0.35 mol of N-bromosuccinimide in 100 ml. of water was added 0.170 mol of m-diisopropenyl benzene while stirring vigorously. After one hour the temperature had increased to 65° C. and gradually decreased to room temperature. Stirring was continued for four hours. The organic materials were dissolved in ether, the phases were separated, and the organic phase was washed with water until neutral. The resultant solution was dried over anhydrous magnesium sulfate and the solvent evaporated.

α,α'-Dihydroxy-β,β'-dibromo-m-diisopropylbenzene was obtained as a viscous oil in 94.5% yield. Infrared analysis was compatible with this compound.

EXAMPLE 2

12.1 mols of potassium hydroxide was dissolved in 500 ml. of water under nitrogen and cooled to room temperature. 1.145 mols of α,α'-dihydroxy-β,β'-dibromo-m-diisopropylbenzene was added over a 30-minute period. The temperature increased spontaneously to 69° C. and the reaction mixture was then heated and maintained at 85° C. for 25 hours. After cooling to room temperature, the organic phase was taken up in 700 ml. of a 1:1 by volume mixture of chloroform and benzene, washed until neutral, dried over anhydrous magnesium sulfate, and the solvent evaporated. A brown oil was recovered corresponding to an 83% yield of m-diisopropylbenzene diepoxide. The product was further purified by vacuum distillation. The product had a boiling point of 85°–86° C. at 0.1 mm. Hg and was colorless.

Infrared and nuclear magnetic resonance analyses confirmed the diepoxide structure. The results of elemental analysis are as follows. Theoretical (percent): C, 75.75; H, 7.37. Found (percent): C, 75.85; H, 7.57.

EXAMPLE 3

0.1 mol of p-diisopropenyl benzene was added to a slurry containing 0.21 mols of N-bromosuccinimide in 200 ml. of water and stirred for one hour at room temperature. The temperature was raised to 50°–55° C. and stirring continued an additional five hours. The organic phase was dissolved in chloroform, washed with water until neutral, and the solvent evaporated. The crude product was recrystallized from chloroform to yield α,α'-dihydroxy-β,β'-dibromo-p-diisopropylbenzene which had a melting point of 135°–137° C.

Infrared and nuclear magnetic resonance analyses confirmed the expected compound. The results of elemental analysis are as follows. Theoretical (percent): C, 41.0; H, 4.54; Br, 45.4. Found (percent): C, 39.6; H, 4.18; Br, 46.6.

EXAMPLE 4

0.01 mol of α,α' - dihydroxy - β,β' - dibromo-p-diisopropylbenzene was stirred into a solution containing 0.1 mol of potassium hydroxide in 5 ml. of water and heated at 40° C. for three hours. 20 milliliters of water and 25 ml. of chloroform were added, the mixture shaken vigorously, and the organic layer washed until neutral. The solvent was evaporated and the crude product recrystallized from hexane. The resultant product had a melting point of 91°–92° C.

Infrared analysis confirmed the p-diisopropylbenzene diepoxide structure.

The results of elemental analysis are as follows. Theoretical (percent): C, 75.8; H, 7.4. Found (percent): C, 75.6; H, 7.3.

EXAMPLE 5

Meta-diisopropyl diepoxide prepared as in Example 2, was cured to a hard solid product with several different types of curing agent. The conditions of cure are summarized in Table I which follows.

TABLE I

| Curing agent | Temperature, ° C. | Time, hours |
| --- | --- | --- |
| Oxalic acid | 60–80 | 1 |
| Maleic acid | 60–80 | 1 |
| Phthalic acid | 150 | 64 |
| Pyromellitic acid | 25 | |
| Pyromellitic dianhydride | 25 | 64 |
| | 150 | 18 |
| Phthalic anhydride | 140 | 16 |
| Trimellitic anhydride | 200 | 1 |
| Lithium hydride | 200 | 64 |
| Tetraethyl ammonium hydroxide | 150 | 64 |
| Tridimethylaminomethylphenol | 150 | 64 |

It will be apparent that many modifications and variations may be effected without departing from the scope of the novel concepts of the present invention, and the illustrative details disclosed are not to be construed as imposing unnecessary limitations on the invention.

We claim:

1. Novel aromatic dihalohydrins of the formula:

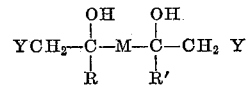

wherein R and R' are members independently selected from the group consisting of alkyl radicals having from 1 to 5 carbon atoms, Y is a halogen radical, and M is meta-phenylene or para-phenylene.

2. α,α'-dihydroxy-β,β'-dibromo-m-diisopropylbenzene.

3. α,α'-dihydroxy-β,β'-dibromo-p-diisopropylbenzene.

References Cited

UNITED STATES PATENTS

| | | | |
| --- | --- | --- | --- |
| 2,315,557 | 4/1943 | Soday | 260—618 D X |
| 2,763,695 | 9/1956 | Beets et al. | 260—618 D |
| 3,100,232 | 8/1963 | Keith et al. | 260—618 D X |
| 3,267,145 | 8/1966 | Lund et al. | 260—618 D UX |

OTHER REFERENCES

Hopff et al., Helv. Chim. Acta., vol. 40 (1957) 274–283.

BERNARD HELFIN, Primary Examiner

U.S. Cl. X.R.

260—348 R, 2 EC, 2 EA, 2 N